(12) United States Patent
Shi

(10) Patent No.: US 9,000,745 B2
(45) Date of Patent: Apr. 7, 2015

(54) SWITCHING REGULATOR AND METHOD FOR OPERATING THE SAME

(75) Inventor: Justin Shi, Ann Arbor, MI (US)

(73) Assignee: Taiwan Semiconductor Manufacturing Company, Ltd. (TW)

( * ) Notice: Subject to any disclaimer, the term of this patent is extended or adjusted under 35 U.S.C. 154(b) by 699 days.

(21) Appl. No.: 13/209,987

(22) Filed: Aug. 15, 2011

(65) Prior Publication Data

US 2011/0298438 A1 Dec. 8, 2011

Related U.S. Application Data

(63) Continuation-in-part of application No. 12/750,149, filed on Mar. 30, 2010, now Pat. No. 8,618,784.

(60) Provisional application No. 61/168,377, filed on Apr. 10, 2009.

(51) Int. Cl.
*G05F 1/00* (2006.01)
*H02M 1/08* (2006.01)
*H02M 3/07* (2006.01)

(52) U.S. Cl.
CPC .. *H02M 1/08* (2013.01); *H02M 3/07* (2013.01)

(58) Field of Classification Search
USPC ................. 323/265, 271, 282–284, 288, 315; 327/108–110
See application file for complete search history.

(56) References Cited

U.S. PATENT DOCUMENTS

| | | | | |
|---|---|---|---|---|
| 5,384,740 A * | 1/1995 | Etoh et al. | ................ | 365/189.09 |
| 5,477,175 A * | 12/1995 | Tisinger et al. | ............... | 327/143 |
| 6,157,180 A * | 12/2000 | Kuo | ............................... | 323/282 |
| 6,535,446 B2 * | 3/2003 | Moscaluk | ...................... | 365/226 |
| 6,747,440 B2 * | 6/2004 | Weder | .......................... | 323/276 |
| 7,230,408 B1 * | 6/2007 | Vinn et al. | ..................... | 323/273 |
| 7,449,944 B2 * | 11/2008 | Byeon et al. | .................. | 327/589 |
| 7,906,948 B2 * | 3/2011 | Qiu et al. | ....................... | 323/282 |
| 7,906,953 B2 * | 3/2011 | Dikken et al. | ................ | 323/288 |
| 7,983,681 B2 * | 7/2011 | Maher | ............................ | 455/445 |
| 2004/0036456 A1 * | 2/2004 | Foss et al. | ..................... | 323/274 |

(Continued)

FOREIGN PATENT DOCUMENTS

| CN | 1211758 C | 7/2005 |
|---|---|---|
| CN | 100472922 C | 3/2009 |

OTHER PUBLICATIONS

Maxim 2A, 76V, High-Efficiency MAXPower Step-Down DC-DC Converters, MAX5090A/B/C, 19/3872; Rev 0/ 3/06, pp. 1-17, www.maxim-ic.com.

(Continued)

*Primary Examiner* — Gary L Laxton
*Assistant Examiner* — Lakaisha Jackson
(74) *Attorney, Agent, or Firm* — Lowe Hauptman & Ham, LLP

(57) ABSTRACT

A switching regulator includes a high side driver electrically coupled with a power line that is configured to provide a supply voltage. A low side driver is electrically coupled between the high side driver and ground. A regulator control circuit is electrically coupled with a gate of the high side driver and a gate of the low side driver. The regulator control circuit is configured to pre-charge a first node between the regulator control circuit and the gate of the high side driver to a first voltage level and to boost the first node to a second voltage level that is higher than the first voltage level to turn on the high side driver.

20 Claims, 10 Drawing Sheets

(56) References Cited

U.S. PATENT DOCUMENTS

2006/0255774 A1* 11/2006 Motomori et al. ............ 323/224
2007/0046275 A1* 3/2007 Shirai et al. ................. 323/284
2007/0182390 A1* 8/2007 Ishii et al. .................... 323/282

OTHER PUBLICATIONS

MPS The Future of Analog IC Technology, MP4460 2.5A, 4MHz, 36V Step-Down Converter, MP4460 Rev. 1.01, Jun. 8, 2011, pp. 1-17, www.monolithicpower.com.

Analog Tech, Product Data Sheet, AAT1184, High-Voltage Step-Down Regulator, 1184.2008.07.1.0, pp. 1-19, www.analogitech.com.

Analog Tech, Product Data Sheet, AAT1189, High-Voltage Step-Down Regulator, 1189.2008.06.1.0, pp. 1-19, www.analogitech.com.

Richtek, RT8250, 3A, 23V, 340kHz Synchronous Step-Down Converter, DS8250-05 Mar. 2011, pp. 1-12, www.richteck.com.

Richtek, RT8251, 5A, 24V, 570kHz Step-Down Converter, DS8251-00 Jul. 2010, pp. 1-16, www.richteck.com.

Office Action dated Feb. 24, 2012 from corresponding application No. CN 201010162889.5.

* cited by examiner

SWITCHING REGULATOR AND METHOD FOR OPERATING THE SAME

CROSS-REFERENCES TO RELATED APPLICATIONS

The present application is a continuation-in-part of and claims the benefit of U.S. patent application Ser. No. 12/750,149, filed Mar. 30, 2010 and entitled "REGULATOR CONTROL CIRCUITS, SWITCHING REGULATORS, SYSTEMS, AND METHODS FOR OPERATING SWITCHING REGULATORS," which in turn claims the benefit of U.S. Application Ser. No. 61/168,377, entitled "REGULATOR CONTROL CIRCUITS, SWITCHING REGULATORS, SYSTEMS, AND METHODS FOR OPERATING SWITCHING REGULATORS" filed on Apr. 10, 2009, which are incorporated herein by reference.

TECHNICAL FIELD

The present disclosure relates generally to the field of semiconductor circuits and, more particularly, to switching regulators and methods of operating the same.

BACKGROUND

In recent years, there continues to be dramatic density increases in integrated circuit technology for semiconductor chips. For example, the minimum feature size of lithography, such as the size of MOSFETs, has been reduced to hundreds of nanometers and below. In the fabrication of precision capacitors in conjunction with FET devices on the same chip at these reduced dimensions, it is increasingly difficult to maintain manufacturing parameters such that precise outputs from these devices are still replicable.

The integrated circuits have been applied in various electronic devices, such as cellular phones, PDAs, computers, and/or other electronic devices. Conventionally, an external power received by the electronic devices is different than that for operating the integrated circuits of the electronic devices. For example, a laptop computer conventionally receives a 12V power from batteries and integrated circuits of the computer function under 3V or 5V. To convert the supplied power to the internal operating voltage, DC-DC converters have been widely applied. Switching regulators have gained wide adoption in recent years due to their high power efficiency, and have replaced linear regulators in many applications.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the numbers and dimensions of the various features may be arbitrarily increased or reduced for clarity of discussion.

DETAILED DESCRIPTION

Figure 1A:
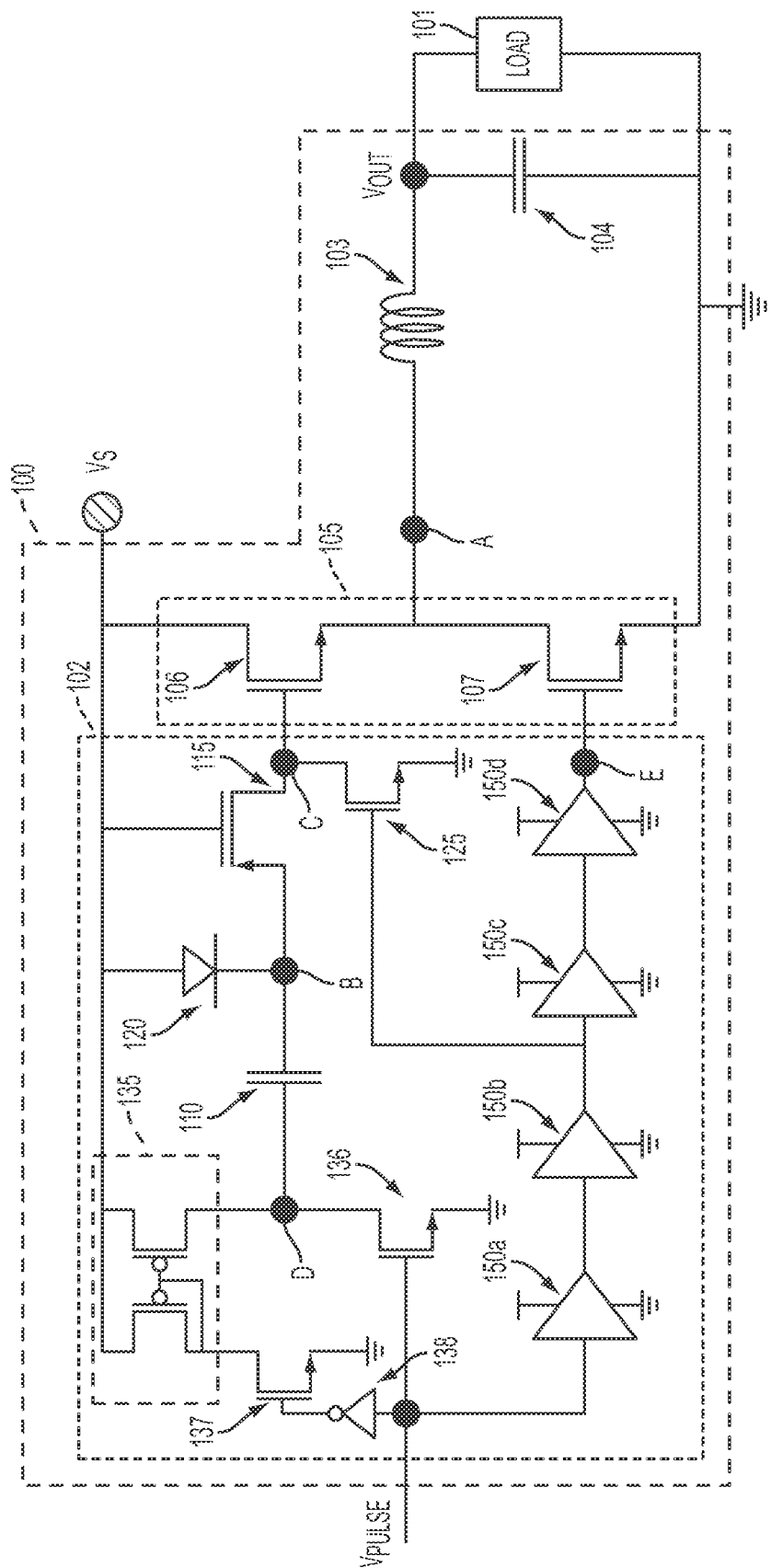
FIG. 1A is a schematic drawing of a first exemplary switching regulator.

A switching regulator can serve as a DC-DC converter. A conventional switching regulator has a driver stage coupled with a power source. The conventional switching regulator can output a regulated voltage. Conventionally, the driver stage consists of a high side driver and a low side driver. The high side driver and low side driver are alternatively turned on to couple the supply voltage and supply ground to an output of the driver stage, respectively. Sometimes, a PMOS transistor is used as the high side driver. It is found that the PMOS transistor has a turned-on resistance higher than that of its NMOS counter part. The high-resistance PMOS transistor may undesirably affect the efficiency of the switching regulator.

To solve the issue involving the high-resistance PMOS transistor, an NMOS transistor has been used to replace the PMOS transistor as the high side driver. In order to turn on the NMOS transistor, a conventional switching regulator uses an off-chip capacitor to boost the voltage at the gate of the NMOS transistor higher than the supply voltage. It is found that the off-chip capacitor makes the design of the switching regulator complicated. The addition of the off-chip capacitor also incurs more cost and assembly overhead.

Another way to boost the voltage at the gate of the NMOS transistor has been proposed by adding a charge pump circuit within a switching regulator. However, during pumping the charge pump circuit may lose energy. The energy loss of the charge pump circuit result in an undesired efficiency loss for boosting the voltage at the gate of the NMOS transistor. It is also found that the area of the switching regulator including the charge pump circuit increases and the design of the switching regulator becomes complicated.

Another conventional switching regulator uses an NMOS transistor as the high side driver and a diode as a low side driver. The switching regulator uses a control circuit to provide a signal to close a switch to couple a boosted voltage to a gate of the NMOS transistor. It is found that the boosted voltage is susceptible to a variation in the supply voltage. The voltage may be over boosted, damaging the gate oxide layer of the NMOS transistor. The voltage may be under boosted, not desirably turning on the NMOS transistor. The switching also allows charge sharing to occur immediately after closing of the switch. This may result in energy loss in boosting the gate voltage.

Based on the foregoing, regulator control circuits, switching regulator, systems, and method for operating the regulator control circuits are desired.

It is understood that the following disclosure provides many different embodiments, or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "lower," "upper," "horizontal," "vertical," "above," "below," "up," "down," "top," "bottom," etc. as well as derivatives thereof (e.g., "horizontally," "downwardly," "upwardly," etc.) are used for ease of the present disclosure of one features relationship to another feature. The spatially relative terms are intended to cover different orientations of the device including the features.

FIG. 1A is a schematic drawing of an exemplary switching regulator. In embodiments using a DC-DC converter, a switching regulator 100 can be configured to receive a supply voltage $V_s$, e.g., about 24V, outputting a regulated voltage $V_{out}$, e.g., about 5 V. The regulated voltage can be applied to various integrated circuits and/or printed circuit boards (PCBs) for operations. In FIG. 1A, the reference numeral 101 can represent a load of at least one integrated circuit coupled within the switching regulator 100. It is noted that the values of the supply voltage $V_s$ and the regulated voltage $V_{out}$ described above are merely exemplary. One of ordinary skill in the art can modify the values to achieve desired supply voltage $V_s$ and regulated voltage $V_{out}$.

Referring to FIG. 1A, the switching regulator 100 can include a regulator control circuit 102, an inductor 103, a capacitor 104, and a driver stage 105. The driver stage 105 can comprise a high side driver 106 and a low side driver 107. Each of the high side driver 106 and the low side driver 107 can have a gate. A drain end of the high side driver 106 can be coupled with the supply voltage $V_s$. A source end of the low side driver 107 can be coupled with the ground. A source end of the high side driver 106 and a drain end of the low side driver 107 can be coupled with the output node A of the regulator control circuit 102.

The regulator control circuit 102 can alternatively couple the supply voltage $V_s$ and ground to an output end A of the driver stage 105. By switching the output end A to the supply voltage $V_s$ or ground, a current can be provided from the supply voltage $V_s$ to charge the inductor 103 or a current can be released from the supply ground to discharge the inductor 103. By controlling a current change of the inductor 103, the regulated voltage $V_{out}$ can be provided to the integrated circuits represented by the load 101.

In some embodiments, the regulator control circuit 102 can be realized within a single integrated circuit. The inductor 103 and the capacitor 104 can be realized over a printed circuit board (PCB). In at least one embodiment, the regulator control circuit 102, the inductor 103, and the capacitor 104 can be formed within the same packaged chip. In yet another embodiment, the inductor 103 and the capacitor 104 can be realized within an integrated circuit.

Referring to FIG. 1A, the regulator control circuit 102 can include a capacitor 110. The capacitor 110 can be configured to store charge provided from the supply voltage $V_s$. The regulator control circuit 102 can include a transistor 115 coupled between the gate of the high side driver 106 and the capacitor 110. A node B can be disposed between the capacitor 110 and the transistor 115. A node C can be disposed between the transistor 115 and the gate of the high side driver 106. In some embodiments, the transistor 115 can be a PMOS transistor, a high-voltage PMOS (HV PMOS) transistor, or other transistor that is capable of transferring charge. In some embodiments, the capacitor 110 and the transistor 115 can be integrated in a single chip or on a single substrate. The capacitor 110 can be disposed within the regulator control circuit 102.

The regulator control circuit 102 can include a diode 120. The diode 120 can be, for example, a zener diode and configured to clamp the voltage at the node B around a predetermined value or less. In some embodiments using a 24 V supply voltage $V_s$, the voltage at the node B can be clamped between about 24 V and about 30 V.

In some embodiments, the regulator control circuit 102 can include a transistor 125 coupled between the node C and ground. In some embodiments, the transistor 125 can be an NMOS transistor, a double diffused MOS (DMOS) transistor, or other transistor. The transistor 125 is operable to couple the node C with ground, turning off the high side driver 106. As noted, a voltage difference between the source and the drain of the transistor 125 can be about greater than $V_S$.

The regulator control circuit 102 can include a current mirror 135, transistors 136, 137, and a logic gate, e.g., an inverter 138. The current mirror 135 can be coupled with the supply voltage $V_s$. The transistor 136 can be coupled between the node D and ground. The transistor 137 can be coupled between the current mirror 135 and ground. The inverter 138 can be coupled between an input end capable of receiving a pulse $V_{pulse}$ and the transistor 137. The pulse $V_{pulse}$ can include a switching cycle for controlling turning on or off of the high side driver 106. The regulator control circuit 102 can also include at least one buffer, e.g., buffers 150a-150d. The buffer 150d can be coupled with the gate of the low side driver 107. The buffer 150a can be configured to receive the pulse $V_{pulse}$ to turn on or off the low side driver 107.

Following is a description regarding charging the capacitor 110. In some embodiments using a 24-V supply voltage $V_s$, the buffer 150a can receive the pulse $V_{pulse}$ for turning on the low side driver 107 and the transistor 125. For example, a node E disposed between the buffer 150d and the low side driver 107 can be about 5 V (shown in FIG. 2A) for turning on the low side driver 107 and the transistor 125. The turned-on transistor 125 can couple the node C with ground (shown in FIG. 2A). The turned-on low side driver 107 can couple the output end A with the ground (shown in FIG. 2A), releasing a current that flows from ground to the capacitor 104 through the inductor 103.

Figure 2A:
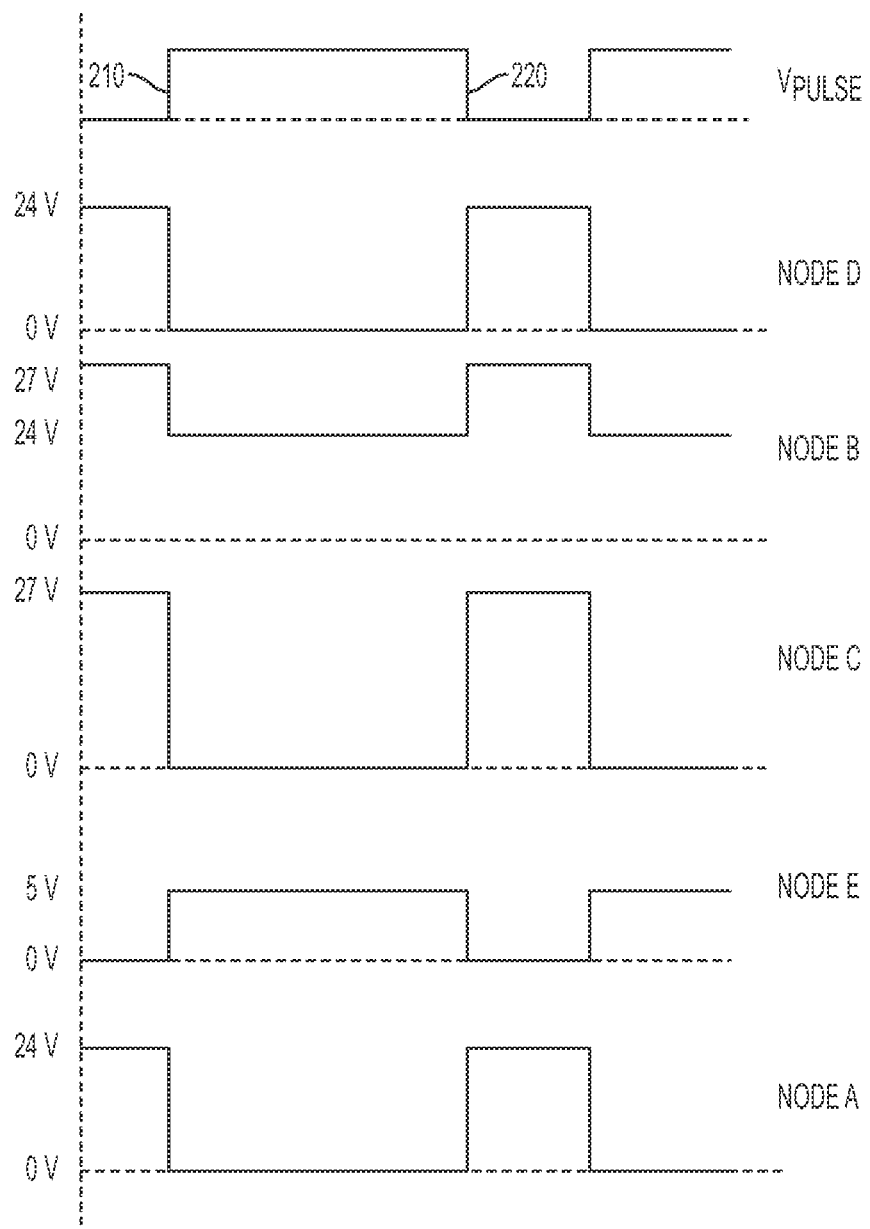
FIG. 2A is a chart of wave forms of various nodes of an exemplary switching regulator.

Referring to FIGS. 1A and 2A, the pulse $V_{pulse}$ can be applied to the inverter 138 and a gate of the transistor 136. The pulse $V_{pulse}$ can have a switching cycle transitioning from a state, e.g., low, to another state, e.g., high as a transition 210 shown in FIG. 2A. Since the transition 210 goes high, the transistor 136 is turned on, coupling a node D disposed between the current mirror 135 and the capacitor 110 to ground. The inverter 138 can invert the high state of the transition 210 to low, turning off the transistor 137. Since the transistor 137 is turned off, the current mirror 135 is off. A current can flow from the supply voltage $V_s$ through the diode 120 to the capacitor 110, charging the capacitor 110. As noted, the supply voltage $V_s$ can be about 24 V. The voltage of the node B can be pulled up and/or kept at about 24 V minus a voltage drop of the diode 120 (shown in FIG. 2A). A voltage drop $V_{BD}$ between the node B and the node D can be about 24 V minus a voltage drop on the diode 120. In some embodiments using a PMOS transistor as the transistor 115, the voltage difference between the gate and the source of the transistor 115 is small and the transistor 115 is turned off. Since the transistor 115 is turned off, the charge and/or voltage at the node B are free from being coupled to the node C.

As noted, the node C is coupled with ground. Without the charge sharing between the nodes B and C, the voltage at the node C is free from turning on the high side driver 106. Since the turned-on low side driver 107 can couple the output end A with the ground (shown in FIG. 2A), releasing a current that flows from ground to the capacitor 104 through the inductor 103.

Following is a description regarding boosting the voltage at the node B. During the boosting period, the low side driver 107 and the transistor 125 are turned off. The voltage of the node E can be pulled down from 5 V to 0 V (shown in FIG. 2A). The turned-off low side driver 107 can shut off the path between the node A and ground. The turned-off transistor 125 can shut off the path between the output end C and ground.

If the switching cycle transitions from high to low, e.g., a transition 220 (shown in FIG. 2A), the transistor 136 can be turned off and the transistor 137 can be turned on. The turned-on transistor 137 can provide a current flowing from the supply voltage $V_s$ to the ground. The current flowing through the transistor 137 can be mirrored such that the right PMOS transistor of the current mirror 135 is turned on, coupling the 24-V supply voltage $V_s$ to the node D. As noted, an existing voltage drop $V_{BD}$, e.g., about 24 V, is between the node B and node D. The voltage at the node B will be boosted to a voltage higher than 24 V. If the boosted voltage is too high, the voltage difference between the node B and the gate of the transistor 115 may damage the gate oxide layer of the transistor 115. By adding the diode 120 between the node B and the supply voltage $V_s$, the boosted voltage at the node B can be clamped at a predetermined value or less. In some embodiments, the boosted voltage can be clamped at about 30 V or less (shown in FIG. 2A).

Since the voltage of the node B is boosted and/or clamped to about 30 V or less, the transistor 115 can operate at a saturation mode. The turned-on transistor 115 can couple the node B with the node C for a charge sharing, pulling up the voltage at the node C (shown in FIG. 2A). Since the voltage at the node C increases to about the turn-on voltage of the high side driver 106 or more, the high side driver 106 can be turned on, coupling the supply voltage $V_s$ with the output end A. A current can be provided from the supply voltage $V_s$ to the inductor 103 for outputting the regulated voltage $V_{out}$. By providing a current or releasing a current through the inductor 103, the switching regulator 100 can serve as a DC-DC converter to convert the supply voltage $V_s$, e.g., 24 V, to the regulated voltage $V_{out}$, e.g., 5 V.

It is found that the charge sharing between the nodes B and C starts if the boosted voltage at the node B is larger than the voltage at the gate of the transistor 115. The boosted voltage at the node B is capable of operating the transistor 115 at a saturation mode for the charge sharing between the nodes B and C. If the boosted voltage at the node B is removed, the transistor 115 is turned off. The turn-on or turn-off of the transistor 115 is controlled by the voltage at the node B and is free from being directly controlled by a control signal applied to the gate of the transistor 115.

Figure 1B:
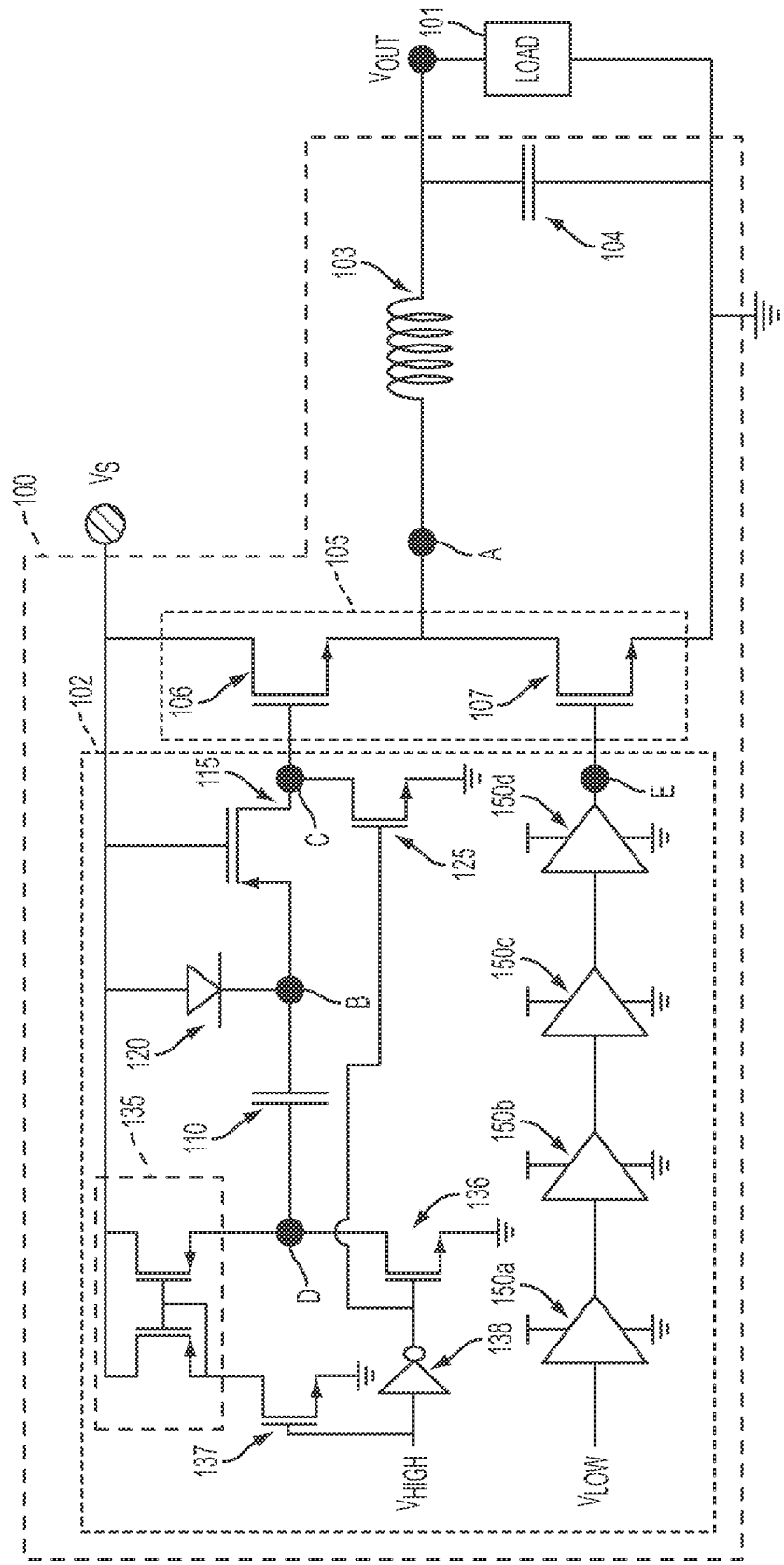
FIG. 1B is a schematic drawing of a second exemplary switching regulator.

It is noted that the regulator control circuit 102 described above in conjunction with FIG. 1A is merely exemplary. The scope of this application is not limited thereto. For example, the regulator control circuit 102 includes the current mirror 135, the transistors 136-137 and the inverter 138 as shown in FIG. 1B. The gate of the transistor 137 and the inverter 138 are configured to receive a high side control signal $V_{HIGH}$. The output of the inverter 138 is electrically coupled with the gate of the transistor 136 and the gate of the transistor 125.

In some embodiments using a 12-V supply voltage $V_s$, the buffer 150a receives the low side control signal $V_{LOW}$ for turning on the low side driver 107. For example, a node E disposed between the buffer 150d and the low side driver 107 is about 5 V (shown in FIG. 2B) for turning on the low side driver 107 and the transistor 125. The turned-on low side driver 107 couples the output end A with the ground (shown in FIG. 2B), releasing a current that flows from ground to the through the inductor 103.

Figure 2B:
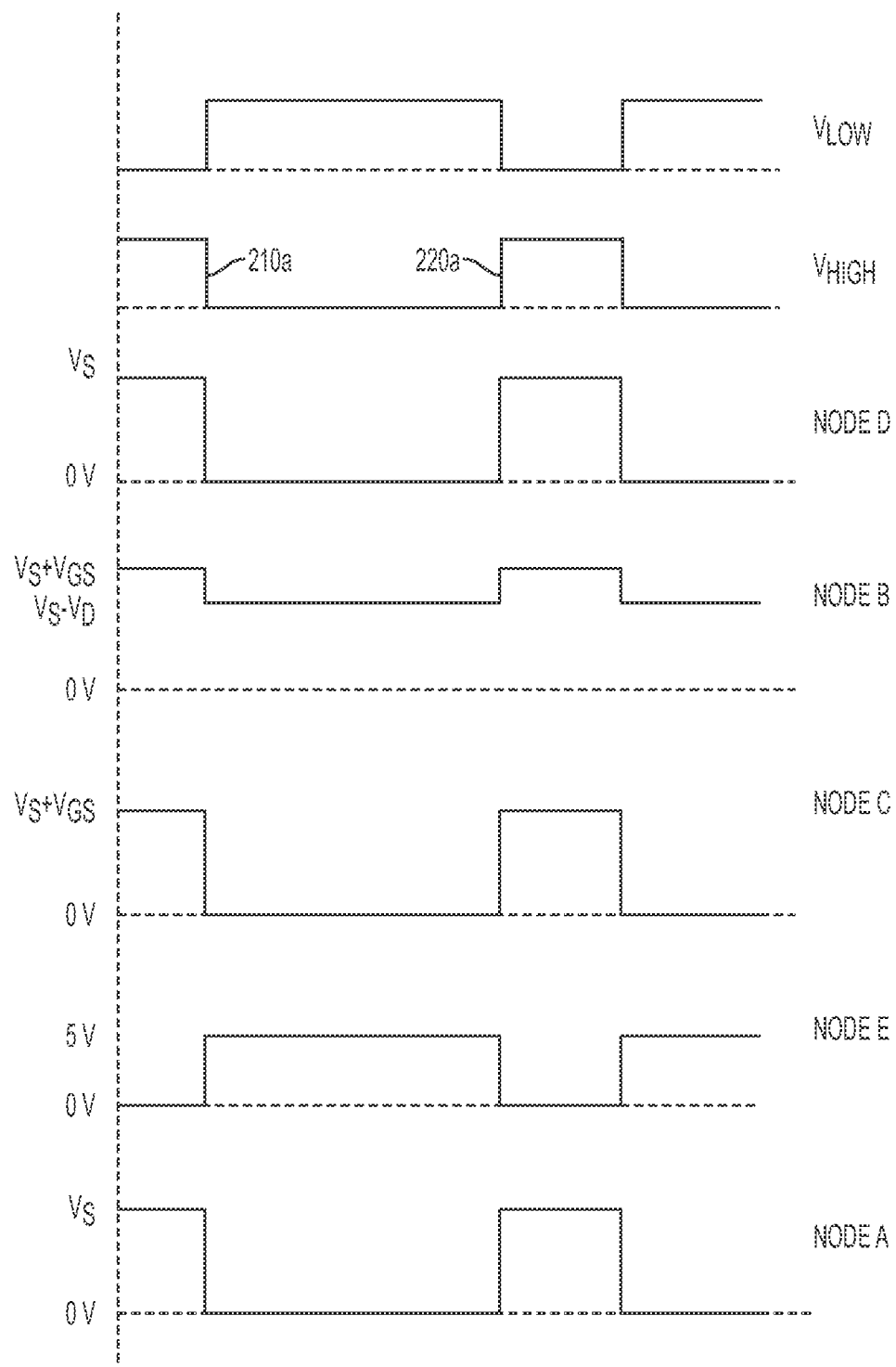
FIG. 2B is a chart of wave forms of various nodes of another exemplary switching regulator.

Referring to FIGS. 1B and 2B, the high side control signal $V_{HIGH}$ is applied to the inverter 138 and the gate of the transistor 137. The high side control signal $V_{HIGH}$ has a switching cycle transitioning from a high state to a low state as a transition 210a shown in FIG. 2B. Since the transition 210a goes low, the inverter 138 inverts the low state of $V_{LOW}$ to a high state turning on the transistor 136, which in turn couples the node D disposed between the current mirror 135 and a terminal of the capacitor 110 to ground. Since the transistor 137 is turned off, the current mirror 135 is not coupled from node D. A current flows from the supply voltage $V_S$ through the diode 120 to another terminal of capacitor 110, charging the capacitor 110. The voltage of the node B can be pulled up and/or kept at about supply voltage $V_S$ minus a voltage drop of the diode 120 ($V_S$-$V_D$) as shown in FIG. 2B. A voltage between the node B and the node D is about supply voltage $V_S$ minus a voltage drop $V_D$ on the diode 120. In some embodiments using a PMOS transistor as the transistor 115, the voltage difference between the gate and the source of the transistor 115 is small and the transistor 115 is turned off. Since the transistor 115 is turned off, the charge and/or voltage at the node B are not being coupled to the node C. As noted, the node C is coupled with ground. Without the charge sharing between the nodes B and C, the voltage at the node C is free from turning on the high side driver 106. Since the turned-on low side driver 107 couples the output end A with the supply ground (shown in FIG. 2B), a current flows from ground to the inductor 103.

Following is a description regarding boosting the voltage at the node B. During the boosting period, the low side driver 107 is turned off by the low side control signal $V_{LOW}$ and the transistor 125 is turned off by the inversion of the high side control signal $V_{HIGH}$. The voltage of the node E is pulled down from 5 V to 0 V (shown in FIG. 2B). The turned-off low side driver 107 shuts off the path between the node A and ground. The turned-off transistor 125 shuts off the path between the node C and ground.

If the high side control signal $V_{HIGH}$ transitions from low to high, e.g., a transition 220a (shown in FIG. 2B), the transistor 136 is turned off and the transistor 137 is turned on. The turned-on transistor 137 provides a current flowing from the supply voltage $V_S$ to the ground. The current flowing through the transistor 137 is mirrored to another transistor of the current mirror 135, coupling the supply voltage $V_S$ to the node D. As noted, a voltage drop $V_{BD}$, e.g., about $V_S$ minus $V_D$, exists between the node B and node D. Also as noted, the voltage at node B is already kept at $V_S$ minus $V_D$. The voltage at the node B is then boosted to a voltage higher than $V_s$ as the high side control signal $V_{HIGH}$ transitions from low to high. If the boosted voltage is too high, the voltage difference between the node B and the gate of the transistor 115 may damage the gate oxide layer of the transistor 115. By adding the zener diode 120 between the node B and the supply voltage $V_S$, the boosted voltage at the node B can be clamped at a predetermined value from the supply voltage $V_S$. In some embodiments, the boosted voltage reaches $V_S$ plus $V_{GS}$, where $V_{GS}$ is a value greater than the threshold of a MOSFET transistor (as shown in FIG. 2B).

Since the voltage of the node B is boosted to $V_S$+$V_{GS}$, the transistor 115 turns on and operates in the saturation mode.

The turned-on transistor 115 couples the node B with the node C for a charge sharing, pulling up the voltage at the node C (shown in FIG. 2B). Since the voltage level at the node C increases to above the supply voltage $V_S$, the high side driver 106 is fully turned on, coupling the supply voltage $V_S$ with the output end A. A current is provided from the supply voltage $V_S$ to the inductor 103 for outputting the regulated voltage $V_{OUT}$. By providing a current from the supply and ground through the inductor 103, the switching regulator 100 serves as a DC-DC converter to convert the supply voltage $V_S$, to the regulated voltage $V_{OUT}$.

It is found that the charge sharing between the nodes B and C starts if the boosted voltage at the node B is larger than the voltage at the gate of the transistor 115 by a threshold. The boosted voltage at the node B is capable of operating the transistor 115 in saturation mode for the charge sharing between the nodes B and C. If the boosted voltage at the node B is below the supply voltage $V_S$, the transistor 115 is turned off. The turn-on or turn-off of the transistor 115 is directly controlled by the voltage at the node B and not by a control signal applied to the gate of the transistor 115.

It is noted that separate control signals $V_{HIGH}$ and $V_{LOW}$ are applied to control the high side driver 106 and low side driver 107, respectively, as shown in FIG. 1B. By using the separate control signals, the driver stage 105 can be turned off during the tri-state mode for lowering the operation power of the circuit.

Figure 3A:
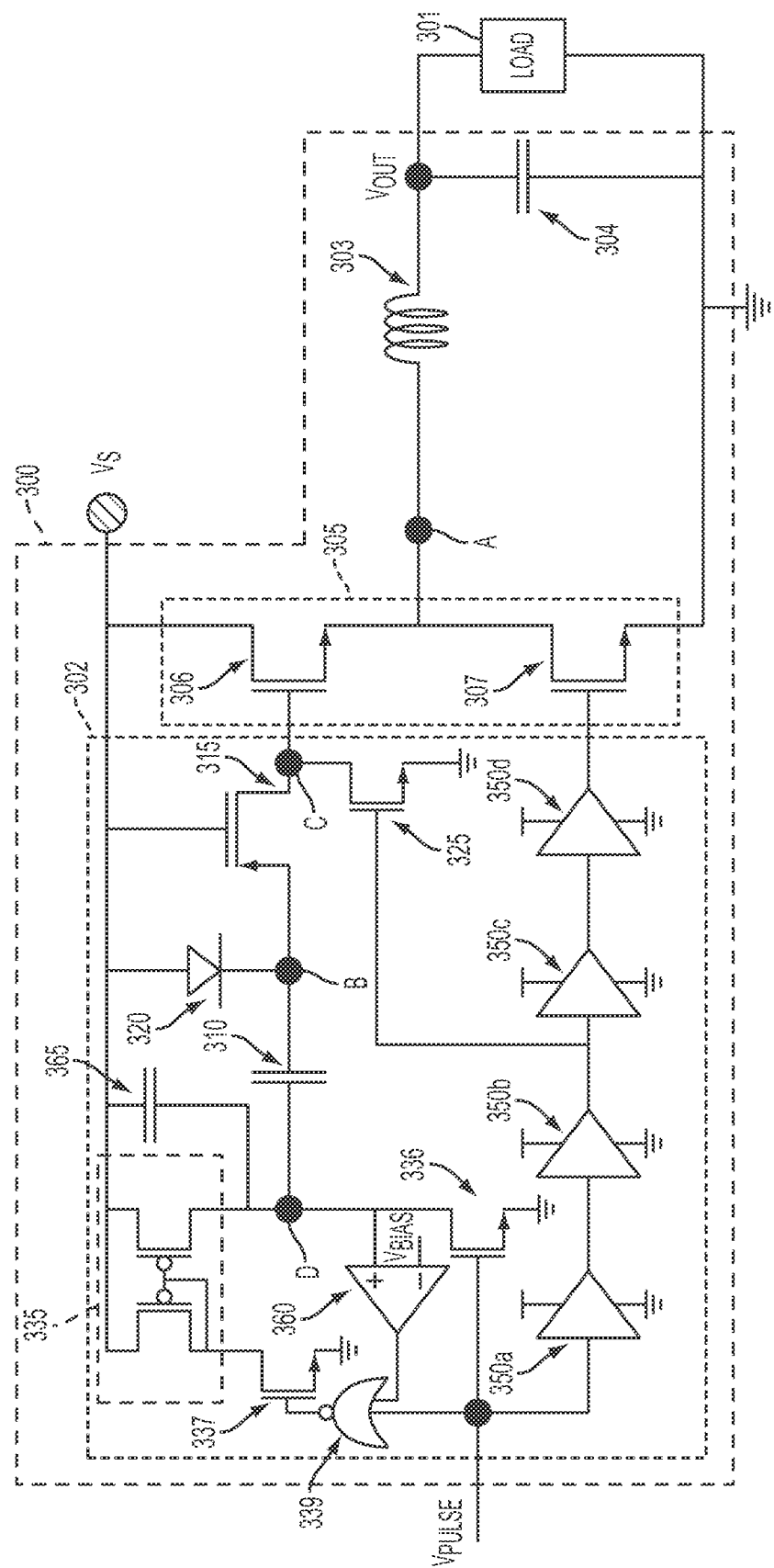
FIG. 3A is a schematic drawing of a third exemplary switching regulator.

FIG. 3A is a schematic drawing of a third exemplary switching regulator. Items of a switching regulator 300 in FIG. 3A that are the same items of the switching regulator 100 in FIG. 1A are indicated by the same reference numerals, increased by 200. In some embodiments, the regulator control circuit 302 can include a comparator 360 and a capacitor 365. The comparator 360 can be disposed between the node D and a logic gate, e.g., a NOR gate 339. The comparator 360 can have a positive end being coupled with the node D and a negative end being coupled with a bias voltage $V_{bias}$. In some embodiments, the bias voltage $V_{bias}$ can be referred to as a reference voltage. The capacitor 365 can be disposed between the node D and the supply voltage $V_s$.

The comparator 360 can be configured to sense the voltage at the node D and output a signal for floating the node D if the voltage at the node D has reached about a predetermined voltage value. For example, if the voltage at the node D is charged to or over the bias voltage $V_{bias}$, e.g., about 10 V, the comparator 360 can output a signal to the NOR gate 339 to turn off the transistor 337. Since the transistor 337 is turned off, no current is mirrored to flow through the right PMOS transistor of the current mirror 335 and the right PMOS transistor of the current mirror 335 is turned off. Since the node D is free from being directly coupled with the supply voltage $V_s$ or ground, the node D is floating. The node D can be charged to a voltage, e.g., about 10 V, substantially less than the supply voltage $V_s$ and still achieve the desired boosted voltage at the node B. By substantially reducing the voltage of the node D for boosting the node B, the power efficiency of the switching regulator 300 can be desirably improved.

The capacitor 365 can be configured to desirably reduce a noise disturbance while the node D is floating. As noted, the node D is substantially free from being directly coupled with a voltage, e.g., the supply voltage $V_s$ or ground after a predetermined voltage has been reached.

Figure 3B:
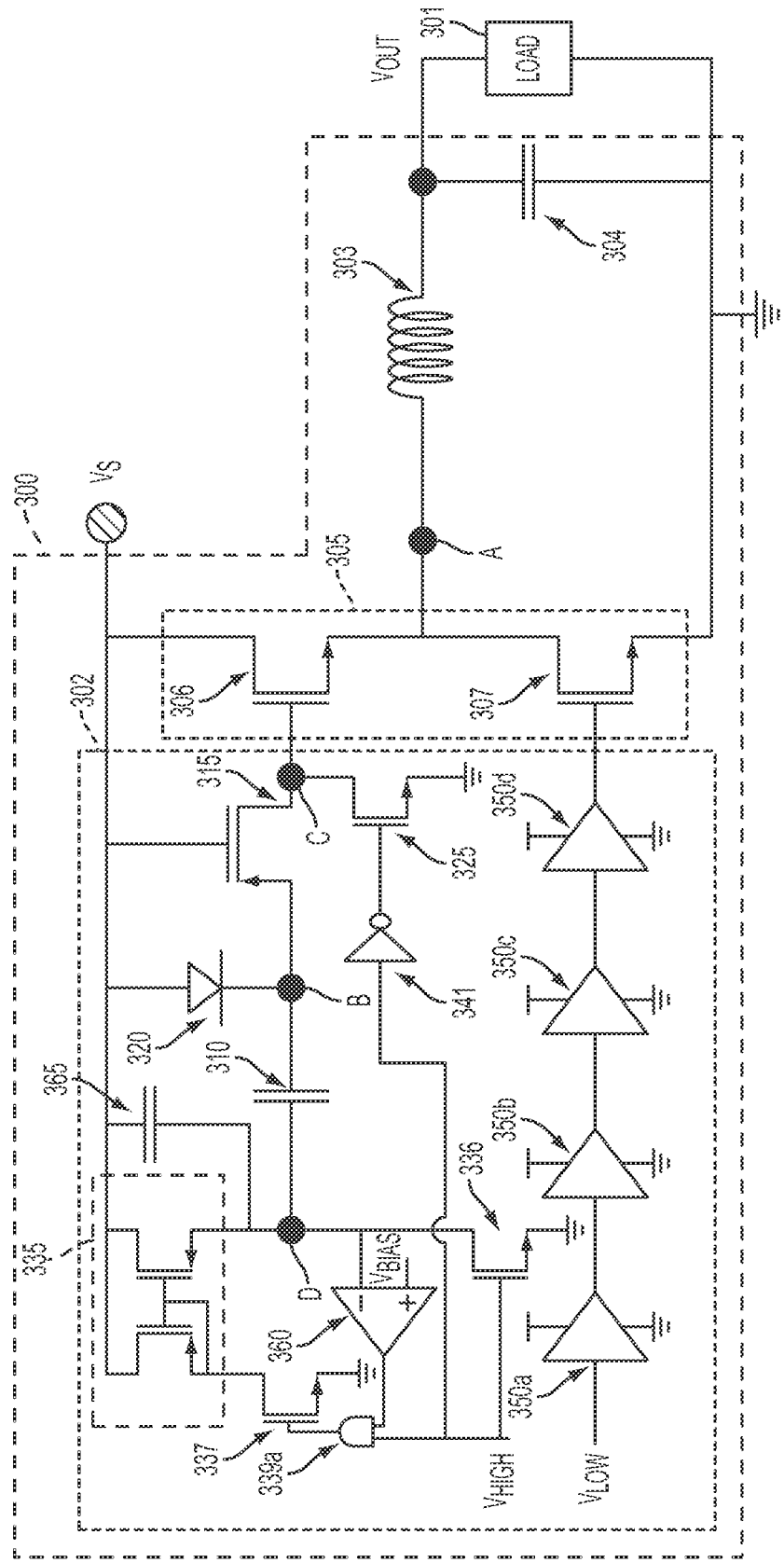
FIG. 3B is a schematic drawing of a fourth exemplary switching regulator.

FIG. 3B is a schematic drawing of a fourth exemplary switching regulator. In FIG. 3B, the regulator control circuit 302 includes an inverter 341 that is configured to receive the high side control signal $V_{HIGH}$. The output of the inverter 341 is electrically coupled with the gate of the transistor 325. The comparator 360 is disposed between the node D and a logic gate, e.g., an AND gate 339a. The comparator 360 has a negative input coupled with the node D and a positive input coupled with a bias voltage $V_{bias}$. In some embodiments, the bias voltage $V_{bias}$ is referred to as a reference voltage. The capacitor 365 is disposed between the node D and the supply voltage $V_S$.

The comparator 360 is configured to sense the voltage at the node D and output a signal for de-coupling the node D from $V_S$ if the voltage at the node D has reached a predetermined voltage value. For example, if the voltage at the node D is charged to or over the bias voltage $V_{bias}$, the comparator 360 can output a signal to the AND gate 339 to turn off the transistor 337. Since the transistor 337 is turned off, no current is mirrored to flow through the current mirror 335 and the current mirror 335 is turned off. Since the node D is free from being directly coupled with the supply voltage $V_s$ or ground, the node D keeps the same voltage. The node D is charged to a voltage substantially less than the supply voltage $V_s$ and still achieves the desired boosted voltage at the node B. By substantially reducing the voltage of the node D for boosting the node B, the power efficiency of the switching regulator 300 is desirably improved.

The capacitor 365 can be configured to desirably reduce a noise disturbance while the node D is floating. As noted, the node D is substantially free from being directly coupled with a voltage, e.g., the supply voltage $V_s$ or ground after a predetermined voltage has been reached.

Figure 4:
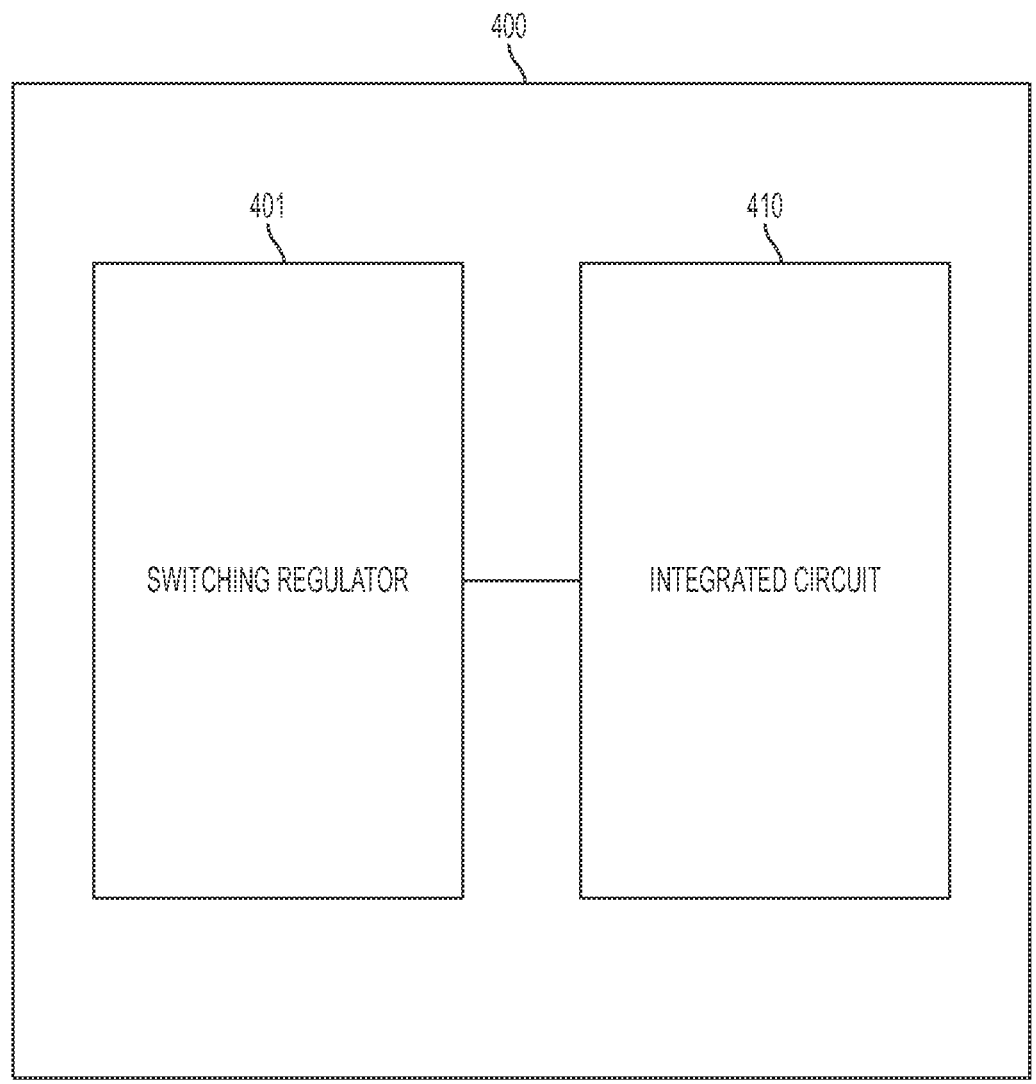
FIG. 4 is a schematic block diagram of a system including an exemplary switching regulator coupled with an integrated circuit.

FIG. 4 is a schematic block diagram of a system including an exemplary switching regulator coupled with an integrated circuit. In FIG. 4, a system 400 can include an integrated circuit 410 coupled with a switching regulator 401. The switching regulator 401 can receive an external supply voltage, converting the supply voltage to a regulated voltage to the integrated circuit 410. In some embodiments, the switching regulator 401 can be the switching regulator 100 or 300 described above in conjunction with FIGS. 1A, 1B, 3A, and 3B. In some embodiments, the integrated circuit 410 can be a microprocessor, central processing unit, digital signal processor, memory circuits, other integrated circuit that can receive the regulated voltage for operations, and/or combinations thereof.

In some embodiments, the integrated circuit 410 and the switching regulator 401 can be formed within a system that can be physically and electrically coupled with a printed wiring board or printed circuit board (PCB) to form an electronic assembly. The electronic assembly can be part of an electronic system such as computers, wireless communication devices, computer-related peripherals, entertainment devices, or the like.

In some embodiments, the system 400 including the integrated circuit 410 can provides an entire system in one IC, so-called system on a chip (SOC) or system on integrated circuit (SOIC) devices. These SOC devices may provide, for example, all of the circuitry needed to implement a cell phone, personal data assistant (PDA), digital VCR, digital camcorder, digital camera, MP3 player, or the like in a single integrated circuit.

Figure 5:
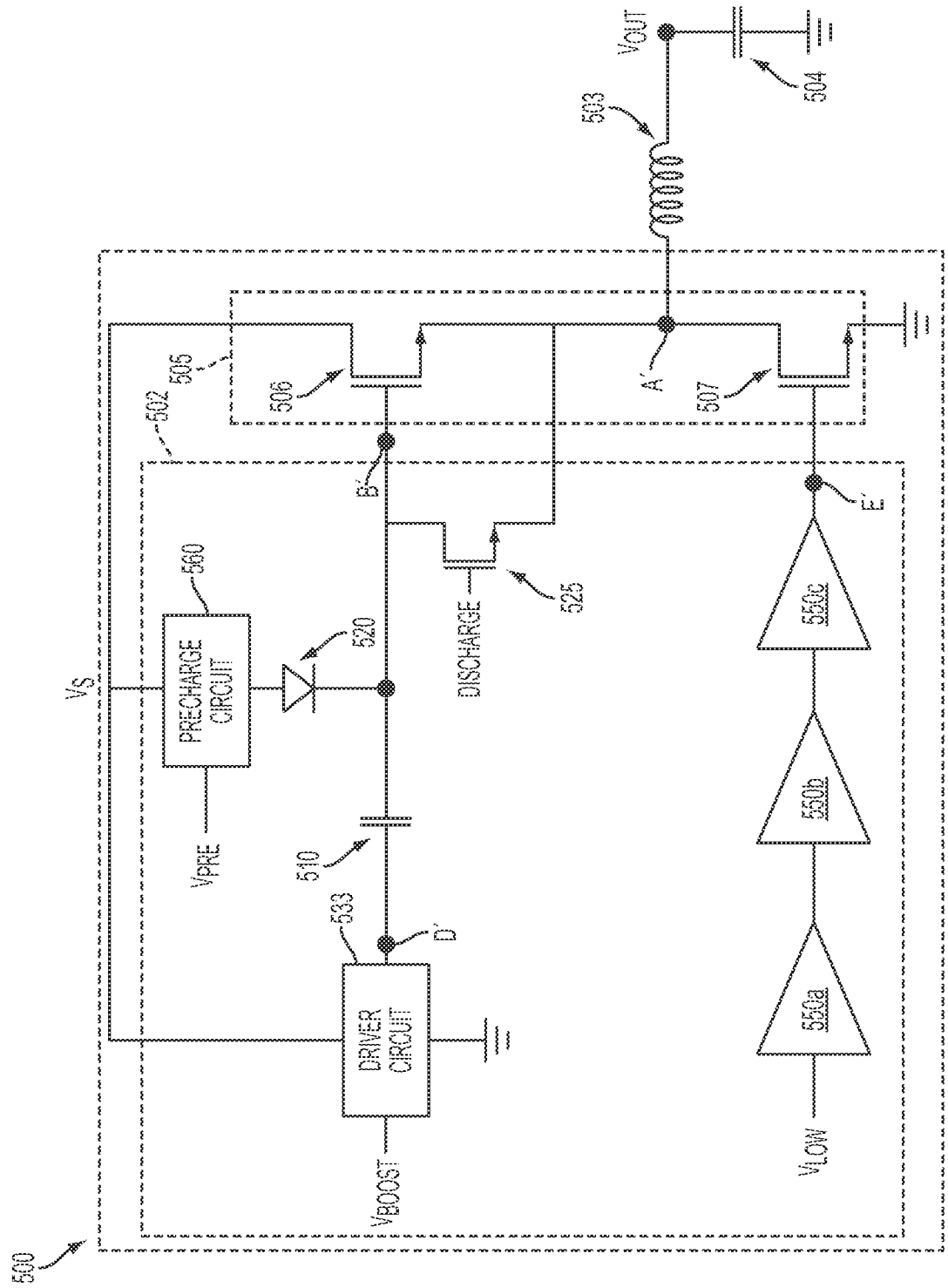
FIG. 5 is a schematic drawing of a fifth exemplary switching regulator.

FIG. 5 is a schematic drawing of a fifth exemplary switching regulator. Items of a switching regulator 500 in FIG. 5 that are the same items of the switching regulator 100 in FIG. 1A are indicated by the same reference numerals, increased by 400. As shown in FIG. 5, the switching regulator 500 includes a regulator control circuit 502 and a driver stage 505. The driver stage 505 includes a high side driver 506 and a low side driver 507. The regulator control circuit 502 is electrically coupled with gates of the high side driver 506 and the low side driver 507. A node A' is between the high side driver 506 and the low side driver 507.

As noted, the switching regulator 500 is operable to charge or discharge an inductor 503 and the capacitor 504. In some embodiments, the high side drive 506 is on and the low side driver 507 is off, such that the supply voltage $V_S$ is electrically coupled to an LC circuit including an inductor 503 and a capacitor 504. In other embodiments, the high side drive 506 is off and the low side driver 507 is on, such that the voltage level on the node A' is electrically coupled with ground to discharge the LC circuit.

Referring to FIG. 5, the regulator control circuit 502 is operable to enable and disable the high side driver 506 and the low side driver 507. The regulator control circuit 502 includes a pre-charge circuit 560. The pre-charge circuit 560 is configured to pre-charge a node B' that is electrically coupled with the gate of the high side driver 506 to a first voltage level. The regulator control circuit 502 then boosts the node B' to a second voltage level that is higher than the first voltage level to turn on the high side driver 506. It is noted that the second voltage level is applied to fully or partially turn on the high side driver 506.

In some embodiments, the regulator control circuit 502 includes a capacitor 510 that is electrically coupled with a diode 520 and the gate of the high side driver 506, as shown in FIG. 5. The diode 520 is electrically coupled with the first terminal of capacitor 110. A pre-charge circuit 560 is electrically coupled between the diode 520 and the supply voltage $V_S$. A driver circuit 533 is electrically coupled with the second terminal of capacitor 510.

In some embodiments, a discharge device 525 is electrically coupled between the node B' and the node A' as shown in FIG. 5. The discharge device 525 is configured to receive a discharge signal "Discharge" to discharge and/or equalize the voltage levels on the nodes B' and A' to turn off the high side driver 506. In some embodiments, the discharge device 525 includes a PMOS transistor, a NMOS transistor, or any other device that is operable to provide a current path to discharge the voltage level on the node B' to the node A'.

Figure 6:
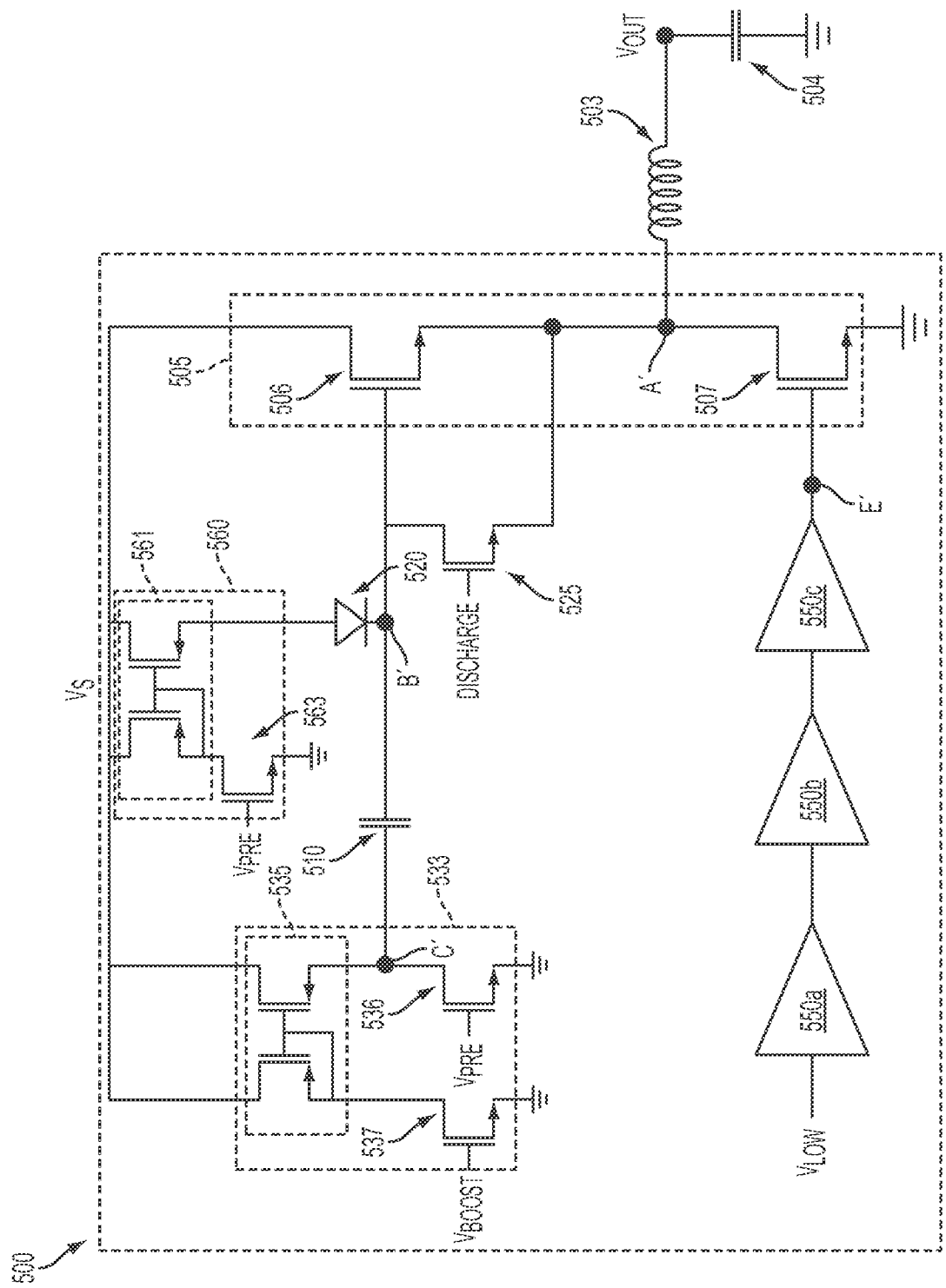
FIG. 6 is a schematic drawing of a sixth exemplary switching regulator.

Referring to FIG. 5, the pre-charge circuit 560 is configured to receive a pre-charge signal "$V_{PRE}$". During on-state of the signal $V_{PRE}$, the pre-charge circuit 560 is operable to pre-charge the node B' to a voltage level that is higher than 0 V but lower than the supply voltage $V_S$. In some embodiments, the pre-charge circuit 560 includes a current mirror 561 and a pull down device 563 as shown in FIG. 6. The current mirror 561 is electrically coupled between the diode 520 and the power line that is configured to provide the supply voltage $V_S$. The pull down device 563 is electrically coupled between the current mirror 561 and ground.

Referring to FIG. 5, the driver circuit 533 is configured to receive a boost signal "$V_{BOOST}$". During on-state of the signal $V_{BOOST}$, the driver circuit 533 is operable to boost the node B' from a present voltage level to a higher voltage level. In some embodiments, the driver circuit 533 includes a current minor 535 and pull down devices 536 and 537. The current minor 535 is electrically coupled with the power line that is configured to provide the supply voltage $V_S$. The pull down device 536 is electrically coupled with the current minor 535 and the second terminal of the capacitor 510. The pull down device 537 is electrically coupled between the current mirror 535 and ground.

In some embodiments, the regulator control circuit 502 includes at least one buffer, e.g., buffers 550a-550c that are electrically coupled in a series fashion and to the gate of the low side driver 507. It is noted that the number of the buffers 550a-550c is merely exemplary. In some embodiments, the number of the buffers can be more or less than 3.

Figure 7:
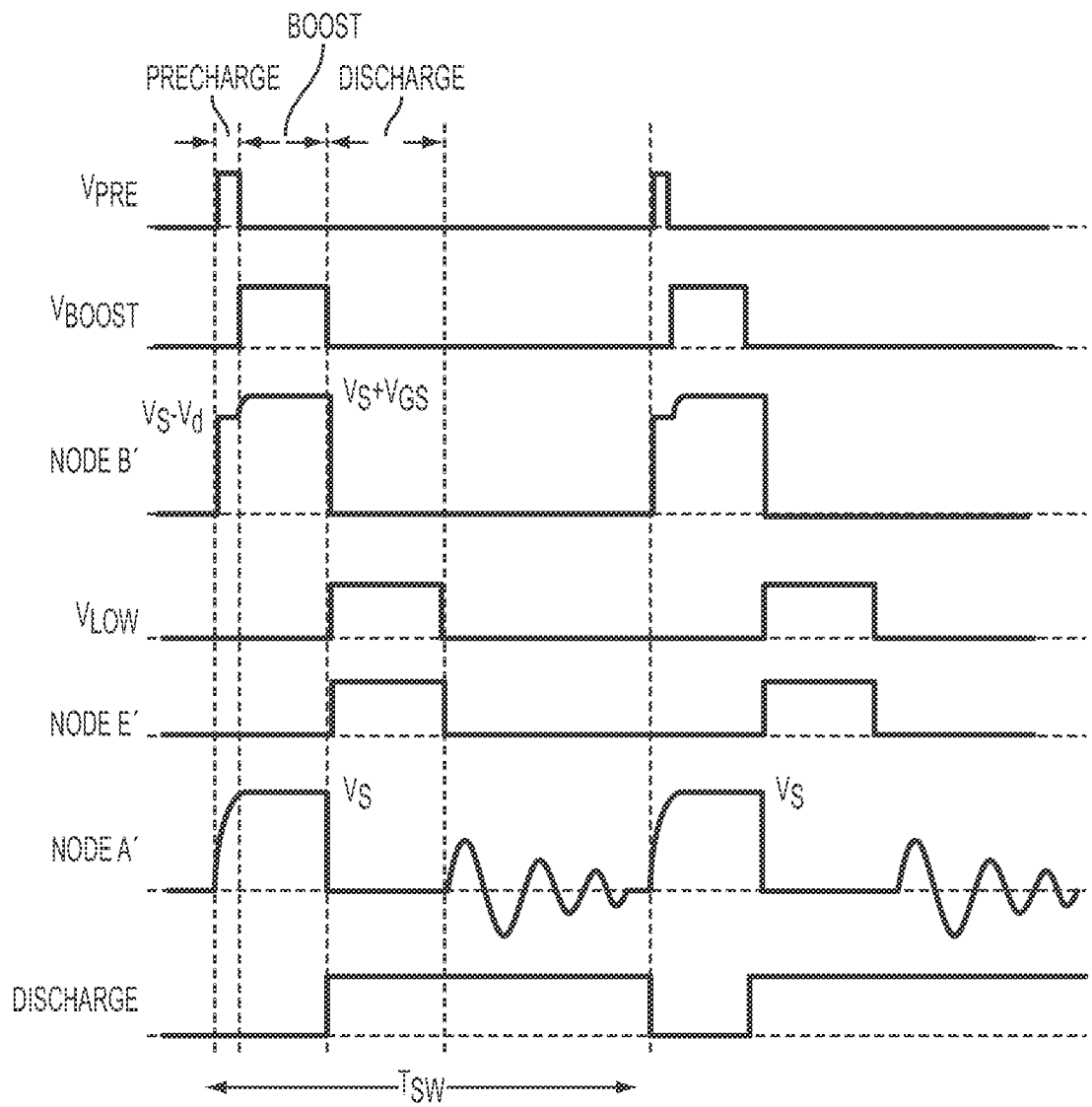
FIG. 7 is a chart of signal wave forms of operating an exemplary switching regulator.

Following are descriptions regarding an exemplary method of charging the LC circuit. FIG. 7 is a chart of signal wave forms of operating a switching regulator. It is noted that transitions of the signals shown in FIG. 7 are merely exemplary. In some embodiments, a time delay of a signal may occur with respect to one or the other signals. In view of the wave forms and circuit drawings in FIGS. 6 and 7, one of ordinary skill in the art can understand the occurrence of the time delay.

As noted, the pull down devices 536 and 563 are configured to receive the pre-charge signal $V_{PRE}$. The pull down device 537 is configured to receive the boost signal $V_{BOOST}$. The discharge device 525 is configured to receive a discharge signal Discharge.

In some embodiments charging the LC circuit, the buffers 550a-550c directly or indirectly receive a signal "$V_{LOW}$". During a pre-charge period, the signal $V_{LOW}$ is low. The voltage state on the node E' of the output end of the buffer 550c is low to turn off the low side driver 507 as shown in FIG. 7.

During the pre-charge period, the voltage state of the signal "Discharge" is low to turn off the discharge device 525. The voltage state of the signal "$V_{PRE}$" is high and the voltage state of the signal "$V_{BOOST}$" is low as shown in FIG. 7. The low voltage state signal "$V_{BOOST}$" turns off the pull down device 537, which in turn turns off the current minor 535. The high voltage state signal "$V_{PRE}$" turns on the pull down devices 536 and 563. The turned-on pull down device 536 electrically couples the second terminal of capacitor 510 to ground, pulling down the voltage level on the node C'. The turned-on pull down device 563 turns on the current minor 561, such that the node B' is electrically coupled with the power line that is configured to provide the supply voltage $V_S$. As the diode 520 is electrically coupled between the node B' and the supply voltage $V_S$ through the current minor 561, the voltage level on the node B' is pre-charged to about the supply voltage $V_S$ minus a diode forward voltage $V_D$ of the diode 520.

After the pre-charge period, a period to boost the voltage level on the node B' follows. During the boost period, the voltage state of the signal "Discharge" is still low and the discharge device 525 is still off. The signal "$V_{PRE}$" goes low and the signal "$V_{BOOST}$" goes high as shown in FIG. 7. The low voltage state signal "$V_{PRE}$" turns off the pull down devices 536 and 563. The high voltage state signal "$V_{BOOST}$" turns on the pull down device 537, which in turn turns on the current mirror 535 and electrically couples the node C' with the power line that is configured to provide the supply voltage $V_S$. As the voltage level on the node C' is raised to the supply voltage $V_S$, the voltage level on the node B' is boosted to a voltage level that is higher than the voltage $V_S$–$V_D$, and substantially equal to $V_S$+$V_{GS}$, where $V_{GS}$ is gate to source potential of the high side driver 506. In some embodiments, the voltage $V_{GS}$ is in the range from about 2 V to about 5V. In other embodiments, the voltage $V_{GS}$ can fall within a range such that the voltage differential between the node B' and the source terminal of the high side driver 506 does not substantially damage the gate dielectric layer of the high side driver 506.

As noted, the low side driver 507 is turned off. The voltage level at node B' is higher than the supply voltage $V_S$ that is electrically coupled to the drain of the high side driver 506. The high side driver 506 is turned on, electrically coupling the supply voltage $V_S$ to the node A' to charge the LC circuit as shown in FIG. 6.

In some embodiments discharging the LC circuit, the signal "$V_{PRE}$" and the signal "$V_{BOOST}$" both go low as shown in FIG. 7. The low voltage state signals "$V_{PRE}$" and "$V_{BOOST}$" turn off the pull down devices 536, 563 and 537, respectively, cutting off the electrical coupling between the node B' and the power line that is configured to provide the supply voltage $V_S$.

During the discharge period, the signal "Discharge" turns on the discharge device 525 as shown in FIG. 7. The turned-on discharge device 525 electrically couples the node B' with the node A', equalizing voltage levels on the nodes B' and A'. This turns off the high side driver 506.

The signal $V_{LOW}$, during the discharge period, goes high and the voltage level on the node E' goes high to turn on the low side driver 507 as shown in FIG. 7. The turned-on low side driver 507 electrically couples the node A' to ground to discharge the LC circuit.

In some embodiments, after the discharge period the signals "$V_{PRE}$", "$V_{BOOST}$", "$V_{LOW}$" and "Discharge" all go low, such that the node A' is floating. Due to the inductor 503, the voltage level on the node A' oscillates. In some embodiments, the period during which the voltage of the node A' oscillates can be referred to as a tri-state period.

In at least one of the embodiments of this application, a switching regulator includes a high side driver electrically coupled with a power line that is configured to provide a supply voltage. A low side driver is electrically coupled between the high side driver and ground. A regulator control circuit is electrically coupled with a gate of the high side driver and a gate of the low side driver. The regulator control circuit is operable to pre-charge a first node between the regulator control circuit and the gate of the high side driver to a first voltage level and boost the first node to a second voltage level that is higher than the first voltage level to turn on the high side driver.

In another one of the embodiments of this application, a method of operating a switching regulator includes pre-charging a first node between a capacitor and a high side driver of a switching regulator to a first voltage level. The first node is then boosted to a second voltage level that is higher than the first voltage level to turn on the high side driver.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A switching regulator comprising:
a high side driver electrically coupled with a power line that is configured to provide a supply voltage;
a low side driver electrically coupled between the high side driver and ground; and
a regulator control circuit electrically coupled with a gate of the high side driver and a gate of the low side driver, the regulator control circuit comprising a capacitor, the capacitor being electrically coupled to the gate of the high side driver at a first terminal of the capacitor regardless of the high side driver being turned on or off, wherein
the regulator control circuit is configured to:
pre-charge the first terminal of the capacitor to a first voltage level during a pre-charge period; and
boost the first terminal of the capacitor to a second voltage level that is higher than the first voltage level to turn on the high side driver during a boost period.

2. The switching regulator of claim 1, wherein the regulator control circuit further comprises:
a pre-charge circuit electrically coupled between a first node and the power line, the first node being between the regulator control circuit and the gate of the high side driver; and
a driver circuit electrically coupled with the capacitor at a second terminal of the capacitor.

3. The switching regulator of claim 2, wherein the regulator control circuit further comprises a diode between the pre-charge circuit and the first node.

4. The switching regulator of claim 2, wherein the pre-charge circuit comprises:
a first current mirror electrically coupled between the first node and the power line; and
a first pull down device electrically coupled between the first current mirror and ground.

5. The switching regulator of claim 2, wherein the driver circuit comprises:
a second current mirror electrically coupled between the power line and the second terminal of the capacitor;
a second pull down device electrically coupled between the second current minor and ground.

6. The switching regulator of claim 2, wherein the regulator control circuit further comprises:
a discharge device electrically coupled between the first node and a second node between the high side driver and the low side driver.

7. The switching regulator of claim 6, wherein the discharge device is configured to discharge the voltage level at the first node.

8. A switching regulator comprising:
a high side driver electrically coupled with a power line that is configured to provide a supply voltage;
a low side driver electrically coupled between the high side driver and ground;
a capacitor electrically coupled with a gate of the high side driver at a first terminal of the capacitor regardless of the high side driver being turned on or off;
a diode electrically coupled with a first node between the capacitor and the gate of the high side driver;
a pre-charge circuit electrically coupled between the diode and the power line; and
a driver circuit electrically coupled with the capacitor.

9. The switching regulator of claim 8, wherein the pre-charge circuit comprises:
a first current mirror electrically coupled between the diode and the power line; and
a first pull down device electrically coupled between the first current mirror and ground.

10. The switching regulator of claim 8, wherein the driver circuit comprises:
a second current mirror electrically coupled with the power line;
a second pull down device electrically coupled with the second current minor and the capacitor; and
a third pull down device electrically coupled between the second current minor and ground.

11. The switching regulator of claim 8, further comprising:
a discharge device electrically coupled between the gate of the high side driver and a a source of the high side driver.

12. The switching regulator of claim 8, further comprising:
a discharge device electrically coupled between the first node and a second node between the high side driver and the low side driver.

13. The switching regulator of claim 12, wherein the pre-charge circuit is configured to charge the first node to a first voltage level during a pre-charge period, and the driver circuit is configured to boost the first node to a second voltage level that is higher than the first voltage level during a boost period.

14. The switching regulator of claim 13, wherein the discharge device is configured to discharge a first voltage level at the first node.

15. A method of operating a switching regulator, the method comprising:
pre-charging a first terminal of a capacitor to a first voltage level, the first terminal of the capacitor being electrically coupled to a gate of a high side driver of a switching regulator regardless of the high side driver being turned on or off; and
boosting the first terminal of the capacitor to a second voltage level that is higher than the first voltage level to turn on the high side driver.

16. The method of claim 15, wherein pre-charging the first node comprises:
pulling down a voltage level at a second terminal of the capacitor; and
electrically coupling the first terminal of the capacitor to a power line that is configured to provide a supply voltage.

17. The method of claim 16, wherein boosting the first terminal of the capacitor comprises:
electrically coupling the second terminal of the capacitor to the power line to boost the first terminal of the capacitor to the second voltage level.

18. The method of claim 15, further comprising:
discharging the second voltage level on the first terminal of the capacitor to turn off the high side driver.

19. The method of claim 18, wherein discharging the second voltage level on the first terminal of the capacitor comprises:
electrically coupling the first terminal of the capacitor with an output node between the high side driver and a low side driver.

20. The method of claim 18, further comprising:
turning on a low side driver of the switching regulator to electrically couple an output node between the high and low side drivers to ground.

* * * * *